United States Patent [19]
Benninger et al.

[11] Patent Number: 5,121,732
[45] Date of Patent: Jun. 16, 1992

[54] ADAPTIVE FUEL/AIR MIXTURE ADJUSTMENT FOR TAKING FUEL CHARACTERISTICS INTO CONSIDERATION

[75] Inventors: Nikolaus Benninger, Vaihingen/Enz; Wolfgang Boerkel, Ruelzheim; Stefan Miller, Waiblingen-Bittenfeld; Guenther Plapp, Filderstadt, all of Fed. Rep. of Germany

[73] Assignee: Robert Bosch GmbH, Stuttgart, Fed. Rep. of Germany

[21] Appl. No.: 709,303

[22] Filed: Jun. 3, 1991

[30] Foreign Application Priority Data

Jun. 1, 1990 [DE] Fed. Rep. of Germany ....... 4017733

[51] Int. Cl.$^5$ .......................... F02M 7/00; F02M 51/00
[52] U.S. Cl. ..................................... 123/672; 123/434
[58] Field of Search ............... 123/489, 440, 575, 1 A

[56] References Cited

U.S. PATENT DOCUMENTS

| | | | |
|---|---|---|---|
| 4,594,968 | 6/1986 | Degobert et al. | 123/575 |
| 4,945,881 | 8/1990 | Gonze et al. | 123/575 |
| 4,945,882 | 8/1990 | Brown et al. | 123/440 |
| 5,007,398 | 4/1991 | Kashiwabara | 123/575 |
| 5,018,483 | 5/1991 | Kashima et al. | 123/575 |

Primary Examiner—Raymond A. Nelli
Attorney, Agent, or Firm—Walter Ottesen

[57] ABSTRACT

In methods for adaptively adjusting a fuel/air mixture, the adaptation factor is rapidly adjusted to take fuel characteristics into account when it develops that after tanking, poor control results are obtained with the adaptation factor previously applicable. As soon as there is an adjustment again to good control results, the conventional relatively slow adaptation is carried out. These methods afford the advantage that they can be carried out without special expensive mixture sensors.

20 Claims, 3 Drawing Sheets

ADAPTIVE FUEL/AIR MIXTURE ADJUSTMENT FOR TAKING FUEL CHARACTERISTICS INTO CONSIDERATION

FIELD OF THE INVENTION

The invention relates to a method for adaptively adjusting a fuel/air mixture for taking fuel characteristics into account with the fuel/air mixture being utilized in internal combustion engines for controlling the air number lambda to a pregiven value. The air number lambda here is the ratio of intake air to fuel. The invention is concerned with methods having two-level control as well as methods having continuous control.

BACKGROUND OF THE INVENTION

In lambda closed-loop control methods with precontrol, values of operating variables are detected and a particular precontrol value is supplied in dependence upon the detected values which determines the quantity of fuel which is supplied to a particular cylinder air charge. As a rule, these precontrol values are base injection times. These precontrol values are determined for pregiven conditions such as for the operation of an engine at 20° C. and $9.8 \times 10^4$ Pa (a technical atmosphere). In practical operation, if the engine is operated under conditions different from those under which the precontrol values were determined, then the particular desired lambda value is not precisely obtained with the precontrol values.

Deviations are compensated with the aid of the lambda control and the adaptation. Adaptation methods function generally in that they integrate the values of the manipulated variable of the lambda controller and multiplicatively or additively couple the integrated value with the precontrol values or with the precontrol values corrected with the control variable. The nature of the coupling and the coupling position during the course of the signal is dependent upon the nature of the change to be adapted. For the following, only that adaptation component is of interest which considers changes which become effective multiplicatively for the correction of precontrol values.

With this adaptation component, deviations can be adapted in the fuel characteristics from the characteristics of the fuel with which the precontrol values were calibrated. The situation which forms the basis of this adaptation will now be explained.

If an engine is driven with gasoline as the fuel, then specific injection times are required to obtain a particular pregiven lambda value for specific operating conditions. If the same engine is driven with methanol in lieu of gasoline, then the same operating conditions require approximately twice the injection times in order to again obtain the same lambda values. In this connection, it is noted that the multiplicative difference between the injection times is somewhat greater than 2; however, for simplicity, the following will be premised on a factor of 2. It is also noted that it is hardly possible to operate an engine selectively in all operating conditions with only gasoline or with only methanol. In the practical application, the limit of the operability of a gasoline engine for all conventional operating conditions lies at a mixture of approximately 85% methanol with 15% gasoline. Such a mixture is noted in the following as a M85-mixture. Again for the sake of explanation, it will however be assumed almost exclusively that either the tank is filled only with gasoline or only methanol.

If the calibration of the base injection times (precontrol values) took place using a M50-mixture, then the base injection times must be multiplied by the factor 1/1.5 (if in the practical operation, gasoline is used) in order to arrive at the desired lambda values without closed-loop control. If the engine is driven with methanol, then the base injection times must in contrast be multiplied by the factor 2/1.5.

These factors adjust for lambda-controlled operation of an internal combustion engine because of an adaptation. The adaptation takes place however relatively slowly to avoid control oscillations because of the feedback operation of the control. The conventional adaptation speeds are so selected that deviations such as caused by greater air pressure changes or temperature changes can be adapted within several minutes. Such changes can amount to approximately 15% if, for example, a vehicle is switched off when the air is warm and the air pressure is low and is then started again a few days later when the air is significantly cooler and the pressure is high. Deviations such as those caused by changed fuel characteristics can however be substantially greater. For example, if a vehicle is first driven with gasoline and then the tank which is almost empty is filled with M85-mixture, the injection times must be increased in length by 85%. The adaptation operation can then have a duration in the order of magnitude of approximately 10 minutes.

Such long adaptation times can lead to considerable difficulties in practical operation. As a first example, assume a so-called interstate highway stop during which a driver tanks the vehicle at an interstate service station where the fuel deviates considerably (for example in its methanol content) from the fuel which was first in the tank. If, after filling the tank and the driver drives at full load, this leads to the consequence that in conventional lambda control methods used at the present time, no control and therefore no adaptation takes place. This is the case because at full load, uncontrolled precontrol operation takes place with the purpose of providing a rich mixture. The fact that in the mentioned operating case, no adaptation takes place for the changed fuel characteristics, has the consequence that the base injection times are continuously multiplied by the incorrect adaptation factor corresponding to the earlier fuel whereby injection times are continuously adjusted which deviate considerably from the actual desired times.

A still more critical case is that which is here described as the motel stop. In this case, a driver tanks his vehicle before stopping at the motel, drives the vehicle into the motel garage and then starts the vehicle again only after spending the night. When starting, and especially in the subsequent warm-up, the problem is presented that in this operating condition also, as at full load, no lambda control takes place. The mixture for the warm-up is therefore determined on the basis of a completely incorrect adaptation factor. This has as a consequence that the vehicle hardly develops power and under some circumstances, the engine can cease operating soon after the starting operation. If the engine does continue to operate and finally develops power which is somewhat usable, the driver will be tempted to soon again drive at full load. The above-mentioned problem then follows the warm-up problem. A condition similar to that of the motel stop can develop when the driver, who while driving has filled the tank with a dissimilar fuel, then again tanks the vehicle shortly before returning home with the fuel customarily used by the driver. Until the driver has then driven the short remaining distance, the adaptation factor has not yet adapted to the new fuel characteristics. With a later start with a cold engine, similar problems can develop as in the situation of the motel stop.

In order to avoid the problems described above, it is known to place a methanol sensor in the tank to measure the methanol concentration of the fuel mixture in the tank. The corrective factor is adjusted in dependence upon the measured concentration. If the corrective factor is, for example, 1.0 for gasoline and then a M85-mixture is added to the almost empty tank, the sensor detects a methanol concentration of 85% which has the consequence that a corrective factor of 1.85 is immediately adjusted. All problems can be avoided by means of this function which are concerned with that the fuel mixture with which an engine is driven can suddenly change by filling the tank.

The advantage just mentioned above which is conditioned upon the use of a methanol sensor also presents the considerable disadvantage that such sensors are very expensive when they are to operate with the required accuracy.

SUMMARY OF THE INVENTION

Accordingly, it is an object of the invention to provide a lambda control method having precontrol and adaptation for considering fuel characteristics which operates with the least expensive arrangement possible and is nonetheless reliable.

In the following, four embodiments of the lambda control method of the invention having precontrol and adaptation are presented for taking into account fuel characteristics. These embodiments have the single common inventive idea that they investigate whether engine operating variables, which are related to the metering of fuel, deviate sharply from expected values. If this is indeed the case, then this is concluded to be based on changes in the fuel characteristics and the appropriate adaptation factor is changed in such a direction that the deviations become smaller.

The first embodiment of the method of the invention is for adaptively adjusting a fuel/air mixture to take fuel characteristics into account, the fuel/air mixture being for an engine having lambda control. The method includes the steps of: checking to determine if the deviation amplitude of the lambda control exceeds a first threshold value; and, if yes, then setting the adaptation speed to an increased value so long until a pregiven condition is fulfilled and thereafter setting back to the usual low adaptation speed.

The second embodiment of the method of the invention includes the steps of: at the first switch-on of the lambda control after the ignition of the engine, setting the adaptive speed to an increased value; and, as soon as a pregiven condition is fulfilled, setting back to the usual low adaptation speed.

These two embodiments of the method differ from each other only by a reversal in their step sequence. The object of the procedure is in both cases to adapt faster than usual when the lambda control deviation amplitude deviates relatively greatly from an expected value. The adaptation speed is increased to the extent that a deviation, which with the usual adaptation speed can be adapted only within a few minutes, is now adapted within a few seconds. This short time span is adequate in the very critical case of the above-mentioned motel stop to provide an adequate adaptation even for very greatly changed fuel characteristics, namely for the short trip, from the service station to the place where the vehicle is parked. In this way, to ensure an adequate adaptation even in the case of the interstate highway stop where a driver after tanking wants to drive immediately at full load, the above methods are advantageously so carried out that full load is only permitted if the switch-back condition to the lower usual adaptation speed is fulfilled.

If the above-mentioned embodiments of the method of the invention are utilized with internal combustion engines which react with great sensitivity to short adaptation times, cases can occur where in the time between tanking and shutdown of the vehicle for several hours, only time is available for a partial adaptation. The above-mentioned problems can then occur at cold start even if not in such an exaggerated form as without one of the methods of the invention. In this case, it is advantageous to utilize the embodiment of the invention described below which can also be used independently. This embodiment of the method of the invention includes the further steps of: determining the fuel quantity of the fuel tank of the motor vehicle corresponding to said engine before and after fuel is added to the tank; computing values for possible fuel mixtures in the tank from these fuel quantities and known fuel mixtures available at service stations; setting the lambda value over a pregiven number of injections alternately with adaptation values as they apply to the various possible fuel mixtures in the tank; investigating with which value the best engine running results are obtained; and, using the value for the best engine running obtained as the then applicable adaptation value.

The embodiment of the method described above is advantageously so carried out that the level of the fuel when switching off the ignition and then again when switching on the ignition is determined. If a difference is present, a computation is made as to what mixture could be in the tank. If for example 20 liters of M50-mixture were in the tank before switching off and 40 liters are present after tanking and as a possible fuel purchase M0 and M100 are available, then M25-mixture or M75-mixture can be present in the tank depending upon whether M0 (gasoline) or M100 (methanol) has been tanked. From the possible fuel mixtures follow possible adaptation factors of which one is correct. If these factors are determined, then, for the case of a six-cylinder engine, three cylinders are supplied with a fuel quantity which was determined while considering the first adaptation factor while the three cylinders following the ignition sequence are supplied with a fuel quantity which has been determined while considering the other factor. For the two different fuel supply time durations, the quality of the engine run is investigated, for example, by means of time durations within which a pregiven crankshaft angle has been traversed. That adaptation factor which led to a better running of the engine is then seen as correct and this adaptation factor is therefore seen as the correct value at this time. Further adaptations are carried out starting from this value as soon as the lambda control is active.

The fourth embodiment of the method of the invention is advantageously utilized with one of the above-mentioned embodiments but can be utilized by itself; however, this embodiment then does not show the good results which are obtained with the other embodiments of the method. This fourth embodiment includes the method steps of: after starting the engine, checking if the engine is in a condition in which control is still prohibited; if yes, then checking if the lambda probe is operationally ready; if yes, then checking if the probe indicates a lean mixture; and, if yes, adjusting the adaptation value in a direction for obtaining a rich mixture at a comparatively high speed for so long until the probe indicates a rich mixture or control is permitted.

For a continuous lambda control, a control to a lambda value less than one can be made.

This method is based on the concept that the precontrol values are so selected for the warm-up that an adjustment to a rich mixture should be made. The probe can detect this rich mixture as soon as it is operationally ready which is the case after a relatively short time duration (approximately 20 seconds) after switching on the ignition. In contrast, the warm-up phase, after which the first lambda control is permitted, takes as a rule considerably longer. The end of the warm-up phase can be determined as that time point at which the engine temperature reaches 20° C. This is the case for example 40 seconds after the start of the engine when the engine has been started at temperatures around freezing or even therebelow. If the operationally ready probe measures a lean mixture in advance of the time that the warm-up phase has ended, this is an indication that the adaptation factor is not adapted to a changed fuel mixture. Therefore, the adaptation factor can be displaced relatively rapidly until the probe measures a rich mixture. The case that a lean mixture is adjusted in the warm-up phase cannot only occur for the use of the first two embodiments of the method which operate only with an active lambda control but this case can even occur with the third embodiment of the method. This last case occurs if not only two different mixtures are at the service station but instead several or any desired amount are available and if the fuel can be mixed as is presently possible such as for the mixture of normal fuel and super fuel. The third method embodiment then computes its adaptation factors on the basis of limit characteristics for the fuels and determines also which of the two limit adaptation values leads to a better operation of the engine; however, this adaptation value is not yet correct. If this adaptation value is already almost correct but the mixture is still too lean, an additional application of the fourth method can lead to improvement. A still further improvement is possible if one of the first two embodiments is used in addition.

BRIEF DESCRIPTION OF THE DRAWINGS

The invention will now be described with reference to the drawings wherein:

FIG. 3 is a flowchart for an embodiment of the method of the invention wherein the adaptation speed is increased when the amplitude of the lambda manipulated variable lies above a threshold;

FIG. 4 is a flowchart for another embodiment of the method of the invention wherein the adaptation speed is increased with the first switch-on of the lambda control;

DESCRIPTION OF THE PREFERRED EMBODIMENTS OF THE INVENTION

Figure 1:
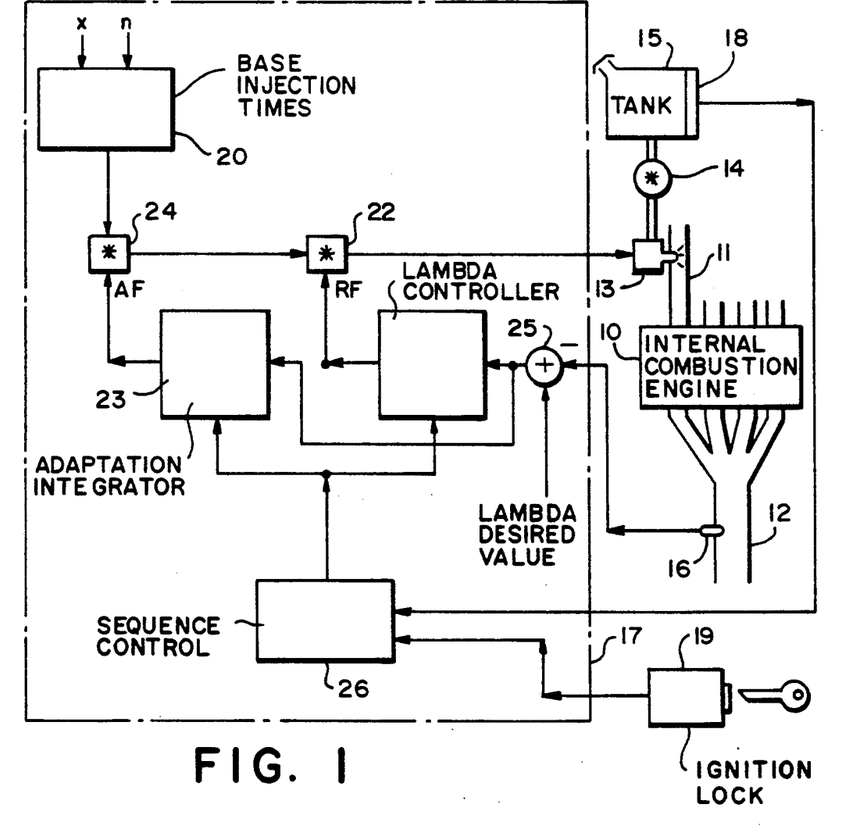
FIG. 1 is an overview schematic showing an internal combustion engine with various function means assigned thereto for carrying out method embodiments of lambda control with precontrol and adaptation to take fuel characteristics into account.

FIG. 1 shows an internal combustion engine 10 on the right-hand side thereof with the engine having an intake pipe 11 and an outlet pipe 12. An injection device is provided in the intake pipe 11 of which only a single injection valve 13 is shown with fuel being supplied to the valve 13 from a tank 15 via a pump 14. The lambda value of the air/fuel mixture combusted by the engine 10 is measured by a lambda probe 16 which is mounted in the outlet pipe 12. The voltages supplied by the probe are to be linearized with the aid of a voltage-lambda value characteristic curve in the case of a continuous lambda control.

A lambda control method with precontrol and adaptation for taking fuel characteristics into account is carried out on the engine 10 with the aid of a control apparatus 17. For this purpose, the control apparatus 17 receives a tank content signal from a level measuring device 18 in the tank 15, an ignition lock signal from the ignition lock 19 as well as a signal which indicates the engine speed (n) and a signal (x) which is generated by measuring the base variable of the load detection (air mass flow, intake pipe pressure or throttle flap angle).

The control apparatus 17 includes the following: means 20 for determining base injection times; a lambda controller 21, a control multiplication position 22; an adaptation integrator 23; an adaptation multiplication position 24; an adding position 25; and, a sequence control 26. The various function positions are usually realized by the hardware and software of a microprocessor.

The particular value of the base injection time is multiplied in the adaptation multiplication position 24 by an adaptation factor AF and in the control multiplication position 22 by a control factor RF for the final injection time which is supplied to the injection valve 13. The control factor RF is supplied from the lambda controller 21 to the control multiplication position 22. The adaptation integrator 23 determines the adaptation factor AF based on the control deviation of the adding stage 25.

Figure 2:
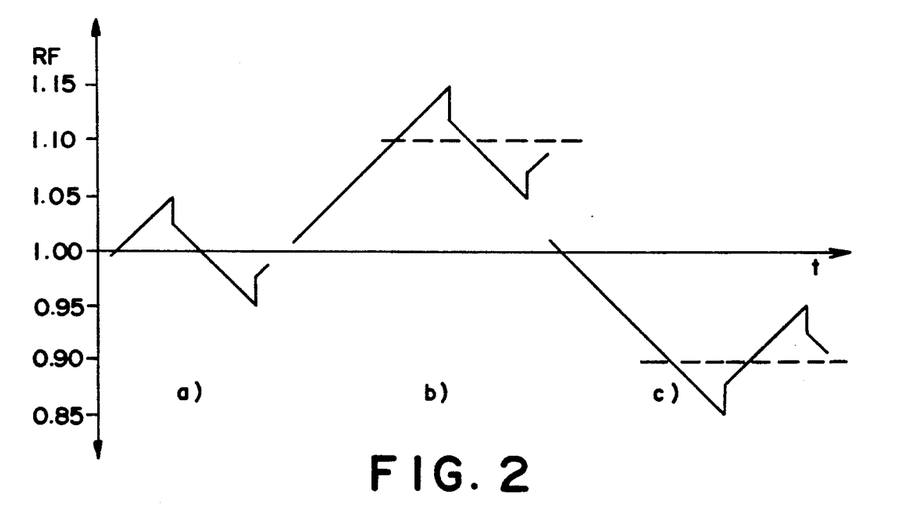
FIGS. 2a to 2c are diagrams showing the time trace of a control factor for corrected precontrol values which lead to the lambda value 1 (FIG. 2a), for adapted precontrol values which are not yet sufficiently adapted and which lead to a lean mixture (FIG. 2b), and for adapted precontrol values which are not yet adequately adapted and which lead to a rich mixture (FIG. 2c)

FIG. 2a shows the time trace of a control factor RF in the case of a lambda control which has reached steady state. The control factor RF includes an integrating component and a proportional component. The proportional component operates in a jump-like manner in opposition to the integrating component with each reversal of the integrating direction in the lambda controller 21. The control factor oscillates with a 5% deviation about the mean value "1". In the following, the amplitude of the oscillation is understood to be the largest deviation of the oscillation from the value "1". In the case of FIG. 2a, the amplitude is therefore 0.05.

FIG. 2b is directed to the case wherein the base injection time corrected with the adaptation factor AF would lead to a lean mixture if the lambda controller 21 would not work in opposition thereto. The lambda controller 21 provides an increase of the control factor RF and therefore an increase in the injection time. The control factor then no longer oscillates about the value "1" but about a higher value which, in the case of FIG. 2b, is the value 1.1. This case occurs for example, when a M85-mixture is added to a M50-mixture in the tank. When the engine 10 is started again after tanking, the adaptation factor AF as well as the control factor are still at the values which were adjusted on the basis of the mixture previously present. The lambda controller 21 determines that a lean mixture is obtained with the old values whereupon the lambda controller adjusts the control factor RF to higher values as shown in FIG. 2b. In FIG. 2b, the control factor amplitude is 0.15, that is, the largest deviation of the control factor RF from the value "1".

FIG. 2c is directed to the case opposite that shown in FIG. 2b, namely, that the control factor RF is to be reduced in order to avoid the adjustment of a mixture which is too rich. This danger is then present when, for example, gasoline is added to a M50-mixture in the tank. The manipulated variable amplitude has the value 0.15 (1−0.85) also in the case of FIG. 2c.

The conditions according to FIGS. 2b or 2c do not continue; instead, an adjustment to the trace according to FIG. 2a again takes place because of the action of the adaptation integrator 23. The speed with which the condition according to FIG. 2a is reached is dependent upon the initial deviation from this condition and the adaptation speed. In the following, methods are described which increase the adaptation speed when the control deviation amplitude exceeds a pregiven threshold value. This threshold value can, for example, be at 15% deviation from the mean value "1". The threshold is advantageously selected as high as possible since the more rapid adaptation has the danger inherent thereto of causing control oscillations and therefore should be utilized only in special cases wherein the danger is present that the engine stops running in the warm-up phase because of a mixture composition which deviates greatly from the normal case. However, most engines can accommodate deviations of 15% of the lambda value desired during warm-up in the normal case and for this reason, this value was selected as the threshold value in the embodiment.

By filling the tank 15 with a fuel having characteristics which deviate sharply from the characteristics of the fuel with which the vehicle was first driven, injection times can be required which differ sharply from those injection times first used. If gasoline is first in the tank and if the vehicle is driven until the tank is almost empty and if then the tank is filled with M85-mixture, the injection times must be increased by 85% compared to those injection times utilized initially. If the adaptation factor AF was first at the value "1", then the adaptation factor must run up to the value of 1.85. However, the lambda controller 21 does not provide a control factor RF which is this high; instead, the controller 21 operates, as mentioned above, only within a limited amplitude that is, for example with a maximum value of 1.25 (or 0.75). The lambda control is therefore not in the position by itself to so correct the base injection times that the long injection times required for the above-mentioned example can be adjusted. It is therefore of great importance that the adaptation operates very rapidly and thereby supplies the required high adaptation factor.

In the embodiments described up to now, the actual value of the control deviation amplitude was used for the comparison with a threshold.

Especially for a two-level control, the amplitude of the manipulated variable can be used as a magnitude equivalent to the control deviation amplitude, that is, the amplitude of the oscillations of the control factor RF about its mean value.

The mentioned increase of the adaptation speed as well as the subsequent reset to the usual low value can take place according to one of the method embodiments which will now be explained with reference to FIGS. 3 and 4.

Figures 3, 4, 6:
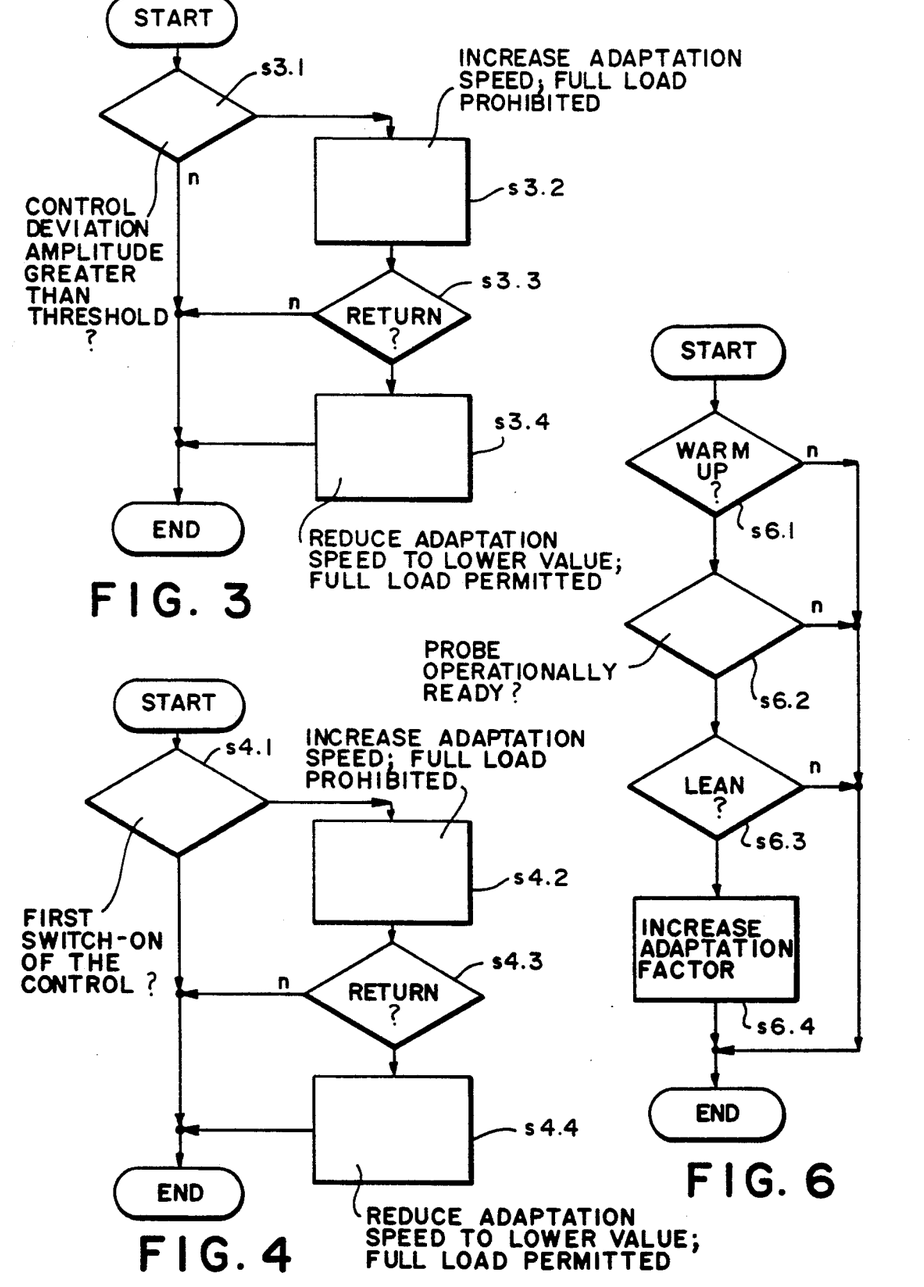

In the embodiment according to FIG. 3, a check is made in step 3.1 as to whether the control deviation amplitude exceeds a threshold value. If this is not the case, nothing further is undertaken. If this is indeed the case, then the adaptation speed is increased in step 3.2. While this speed is increased, a check is continuously made in step 3.3 as to whether a pregiven condition is fulfilled which indicates that a return should be made to the usual low adaptation speed. If the condition is not fulfilled, then the adaptation speed remains at its high value; otherwise, the adaptation speed is reset in step 3.4. The return condition checked in step 3.3 preferably comprises that a check be made as to whether the control deviation amplitude drops below a second threshold value which preferably coincides with the first threshold value. The second threshold value can however also be lower than the first. The condition however can also include that a check be made of a pregiven time duration that has passed since the adaptation speed was increased. The time condition is advantageously used as a further requirement in addition to the threshold condition in order to prevent that the adaptation at higher speed remains switched in continuously in the case of an error.

Preferably, the method according to the flowchart of FIG. 3 is only then carried out when the lambda control becomes operational for the first time after switching on the ignition. Only after a restart can it be expected that larger adaptations can be required. This is so because as a rule a tank is not filled with the engine running. Accordingly, large lambda value deviations cannot occur in the normal case with the engine running; instead, only with a restart after tanking. The above-mentioned measure avoids that the method according to the flowchart of FIG. 3 is carried out continuously even though this is not required.

The method embodiment according to the flowchart of FIG. 4 is very similar to the flowchart of FIG. 3. For the method embodiment explained above, the increased adaptation speed can only then be switched on when this is absolutely necessary; however, with the method embodiment according to FIG. 4, a switch to increased adaptation speed (step 4.2) is always made when the control is first switched on (step 4.1) but this adaptation speed is immediately reduced (step 4.4) when a return condition (step 4.3) is fulfilled. The return condition can also be provided as explained with respect to step 3.3.

The embodiments according to FIGS. 3 and 4 operate only when the lambda control is active. This is the case for lambda control methods having rich control as soon as the lambda probe is operationally ready. In contrast, for methods without rich control, the lambda control becomes effective only at the end of the warm-up and the lambda control is then subsequently operative only so long as the engine is not operated at full load. In order to ensure a rapid adaptation when this is required, full load is forbidden in the embodiment as long as the adaptation speed is increased. This is indicated in FIGS. 3 and 4 in the steps 3.2 and 4.2, respectively. However, the time duration until the probe is operationally ready or even to the end of the warm-up phase (when there is no rich control), remains problematical.

Figure 5:
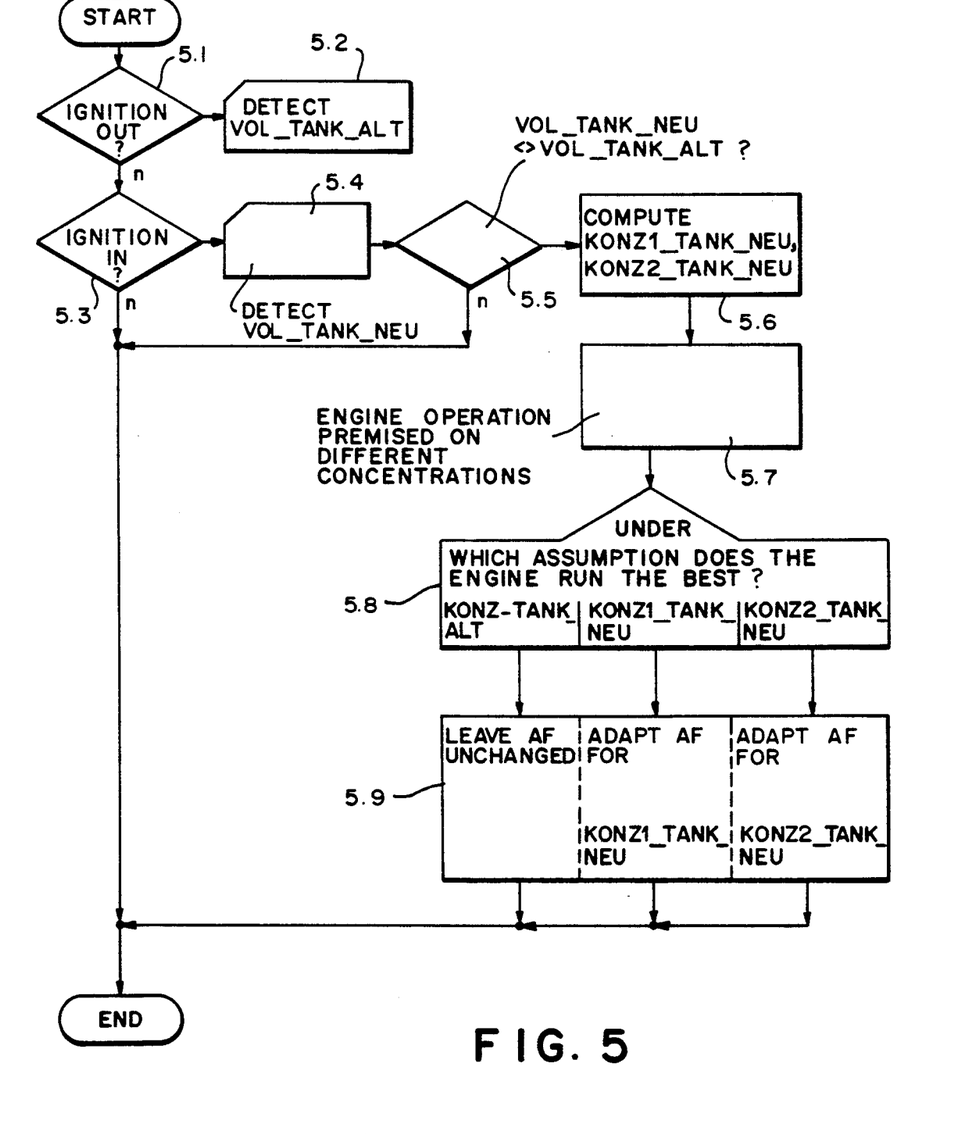
FIG. 5 is a flowchart for another embodiment of the method of the invention wherein several adaptation factors are computed based on information as to the tank content with one of the adaptation factors being assumed to be correct; and, FIG. 6 is a flowchart of still another embodiment of the method of the invention wherein the adaptation factor is increased rapidly when the lambda probe announces a lean mixture during warm-up.

The embodiment of the method according to the flowchart of FIG. 5 bridges the above-mentioned time regions. This method embodiment can be utilized without the method embodiments according to the flowcharts of FIGS. 3 or 4 when it is configured for adequate precision.

In the method embodiment of the flowchart according to FIG. 5, a check is made in step 5.1 as to whether the ignition is switched off. If this is the case, then the tank volume VOL_TANK_ALT is detected in step 5.2. If a determination is made that the ignition is again switched on (step 5.3), the new tank volume VOL_TANK_NEU is determined (step 5.4). In step 5.5, a check is made as to whether the two volumes differ from each other. If this is not the case, then nothing further is undertaken. In contrast, if this is indeed the case, two possible new tank mixtures are computed as concentrations of, for example, methanol in gasoline. The two possible concentrations as computed in step 5.6 are shown here as KONZ1_TANK_NEU and as KONZ2_TANK_NEU. The computation takes place and is explained for the first concentration as follows:

$$VOL\_NEU \times KONZ1\_TANK\_NEU =$$
$$VOL\_ALT \times KONZ\_TANK\_ALT +$$
$$(VOL\_NEU - VOL\_ALT) \times KONZ1\_TS$$

wherein:
VOL_ALT: tank volume before tanking;
VOL_NEU: tank volume after tanking;
KONZ_TANK_ALT: concentration of methanol in the fuel mixture before tanking; and,
KONZ1_TS: concentration of methanol in a first fuel mixture as purchased at a service station.

The above equation can be easily solved for KONZ1_TANK_NEU. Likewise, the value KONZ2_TANK_NEU can be computed in that the value KONZ1_TS can be substituted in the equation by the value KONZ2_TS as it applies for the methanol content in a second fuel mixture as it is purchased at service stations. If basically only two different mixtures are sold such as M0 (gasoline) and M85, these two values are used for the computation. If any desired mixtures can be tanked, then the concentration values for the two obtained extremes are used.

As an example, the assumption is made that the concentration of methanol before tanking amounted to approximately 50%. After tanking, concentrations of 25% or 75% are possible. Before tanking, the lambda control was in a balanced condition and the adaptation factor has assumed the value 1.5. The new possible concentrations of methanol in the tank require then an adaptation factor of 1.25/1.5 or 1.75/1.5 (assuming that pure methanol requires injection times increased by a factor of 2 in comparison to the use of pure gasoline), if for the same operating conditions, the same lambda values are to be obtained with corresponding injection times as before tanking.

In a step 5.7, the engine is operated in sequential time durations with injection times which were computed on the basis of the old adaptation factors or on the basis of the two new adaptation factors. If only two fixed mixtures can be tanked, then only the two new adaptation factors are to be considered further. A check is then made as to the quality of the running of the engine in the different time durations. The length of the time duration to be selected is dependent upon the nature of the check of the quality of the running of the engine. If this would be determined on the basis of combustion chamber pressures, then it would be adequate to operate three cylinders with the three different mentioned injection times. The combustion chamber pressure is then measured at a fixed crankshaft angle (referred to the particular stroke of the cylinder) and that cylinder would be viewed as the best working cylinder which has the highest pressure. The adaptation factor is then set to that value with which the injection time for this cylinder was computed (steps 5.8 and 5.9). The adaptation factor determined in this manner can also be adjusted with still greater precision by a conventional slow adaptation method which is then especially the case when any kind of mixtures are tanked so that it is not possible to precisely anticipate which concentrations will be present in the tank after tanking. In the event that a rapid method embodiment according to the flowcharts of FIG. 3 or FIG. 4 is provided, such an embodiment can follow that method shown in the flowchart of FIG. 5 after the control has started operation.

In the foregoing, it was noted that the quality of engine running was decided with the aid of the combustion chamber pressure. However, this judgment requires special sensors which are usually not provided on engines of the present day. If the quality of the engine running is checked in another manner, then the short time durations which follow one another and wherein different injection times are used, are advantageously selected to be longer. For example, the time can be measured within which a specific crankshaft angle range is traversed. If this measurement is carried out for cylinders which follow one another directly in the ignition sequence, then the measurement is relatively imprecise. It is more dependable to supply three cylinders following one another in the ignition sequence (independent of the number of cylinders of the engine) with the same injection times, that is, first three cylinders with the injection times based on the old adaptation factor and then three cylinders with injection times based on the first new adaptation factor and finally, three sequential cylinders with injection times based on the second new adaptation factor. In each of the three sequential segments for the same injection time, the time duration for the crankshaft angle range of each of the last segments is measured. The shortest measured time duration is seen as the one with the best running of the engine.

In the embodiment according to the flowchart of FIG. 5, the tank volumes dependent upon "ignition out" or "ignition in" are determined and the measuring results are stored at the mentioned time points. The measurement and storage can however, for example, also be done in dependence upon the actuation of the check flap in the fuel tank filling stop.

As already stated above, the warm-up phase is above all critical for the change of the adaptation factor. When carrying out the method embodiment pursuant to the flowcharts of FIGS. 3 or 4, nothing can be undertaken during warm-up if there is no control method with rich control. In the method embodiment of FIG. 5, an adaptation to an unexpected tank mixture during the warm-up phase cannot be made under the conditions set forth above. In this case, a method embodiment is of assistance as will be explained in the following with reference to the flowchart of FIG. 6. However, this method embodiment cannot only be used with one of the method embodiments described above where it is of special advantage but it can also be used on its own which will be explained further below.

In the method embodiment according to FIG. 6, a check is made in a step 6.1 as to whether the engine on which the method embodiment is used is in the warm-up phase. If this is the case, a check is made as to whether the probe is operationally ready (step 6.2). If this is the case, then a further check is made as to whether the lambda probe indicates a lean mixture (step 6.3). If this is the case, then the adaptation factor AF is rapidly increased (step 6.4). This increase is continued as long as the above-mentioned conditions are fulfilled, that is, as long as the warm-up phase continues and a lean mixture is indicated.

It should be considered that the lambda probe after switching on the probe heater reaches operational readiness relatively quickly (typically in approximately 20 to 30 seconds). If the probe heater is switched on with the switching on of the ignition, then, as a rule, one or two start attempts are adequate until the probe is operationally ready. At this instant, the mentioned rapid adaptation of the adaptation factor takes place so that the start attempt then following is successful with great probability since a mixture can quickly be adjusted which is not so lean that the started engine again immediately stops running. The adaptation is already so far advanced by the time the lambda control is operating that the usual slow adaptation for eliminating the residual deviations is adequate.

The last-mentioned explanations make clear that the method embodiment according to the flowchart of FIG. 6 can also be utilized by itself and provide satisfactory results.

It is understood that the foregoing description is that of the preferred embodiments of the invention and that various changes and modifications may be made thereto without departing from the spirit and scope of the invention as defined in the appended claims.

What is claimed is:

1. A method for adjusting a fuel/air mixture to take fuel characteristics into account, the fuel/air mixture being for an engine equipped with a control apparatus including a lambda controller for producing a lambda control factor RF and an adaptation integrator for producing an adaptative factor AF for operating on the control factor RF with a predetermined speed, the lambda control factor deviating from an amplitude 1.0 during operation of the engine, the method comprising the steps of:

monitoring the amplitude of the lambda control factor RF to determine if the amplitude deviates from said value 1.0 to exceed a first threshold value indicative of a changed composition of the fuel; and, if yes, then increasing the speed at which said adaptative factor AF operates on said lambda control factor RF from a first adaptation speed corresponding to the normal operation of the engine to a second adaptation speed greater than said first adaptation speed until a pregiven condition is fulfilled and thereafter reducing said speed back to said first adaptation speed.

2. The method of claim 1, wherein said pregiven condition is the elapse of a pregiven time duration starting from the increase of the adaptation speed to said second adaptation speed.

3. The method of claim 1, wherein said pregiven condition is that the deviation amplitude of the lambda control factor RF drops below a pregiven second threshold value.

4. The method of claim 3, wherein said first and second threshold values are coincident.

5. The method of claim 1, wherein full-load operation of the engine is only permitted when the condition for reducing to said first adaptation speed is fulfilled.

6. The method of claim 1, comprising the further steps of:

determining the fuel quantity of the fuel tank of the motor vehicle corresponding to said engine before and after fuel is added to the tank;

computing values for possible fuel mixtures in the tank from these fuel quantities and known fuel mixtures available at service stations;

setting the lambda value over a pregiven number of injections alternately with adaptation values as they apply to the various possible fuel mixtures in the tank;

investigating with which value the best engine running results are obtained; and, using the value for the best engine running obtained as the then applicable adaptation value.

7. The method of claim 6, comprising the further step of:

distributing two conceivable adaptation values amongst two cylinder groups so that cylinder assignment to an adaptation value can be varied from one cycle to the next.

8. The method of claim 6, wherein the engine running is judged with the aid of time durations during which a pregiven crankshaft angles are traversed.

9. The method of claim 1, comprising the further steps of:

after starting the engine, checking if the engine is in a condition in which control is still prohibited;

if yes, then checking if the lambda probe is operationally ready;

if yes, then checking if the probe indicates a lean mixture; and, if yes, adjusting the adaptation value in a direction for obtaining a rich mixture at a comparatively high speed for so long until the probe indicates a rich mixture or control is permitted.

10. The method of claim 6, comprising the further step of:

distributing two conceivable precontrol values amongst two cylinder groups so that cylinder assignment to a precontrol value can be varied from one cycle to the next.

11. A method for adjusting a fuel/air mixture to take fuel characteristics into account, the fuel/air mixture being for an engine equipped with a control apparatus including a lambda controller for producing a lambda control factor RF and an adaptation integrator for producing an adaptation factor AF for operating on the control factor RF with a predetermined speed, the lambda control factor RF deviating from the amplitude 1.0 during operation of the engine, the method comprising the steps of:

at the first switch-on of the lambda controller after switching on the ignition of the engine, increasing the speed at which said adaptative factor AF operates on the lambda control factor RF from a first adaptation speed corresponding to the normal operation of the engine to a second adaptation speed; and,     as soon as a pregiven condition is fulfilled, reducing said adaptation speed back to said first adaptation speed.

12. The method of claim 11, wherein said pregiven condition is the elapse of a pregiven time duration starting from the increase of the adaptation speed.

13. The method of claim 11, wherein said pregiven condition is that the deviation of the amplitude of said lambda control factor RF drops below a pregiven second threshold value.

14. The method of claim 13, wherein said first and second threshold values are coincident.

15. The method of claim 11, wherein full-load operation of the engine is only permitted when the condition for resetting to the usual low adaptation speed is fulfilled.

16. The method of claim 11, comprising the further steps of:

determining the fuel quantity of the fuel tank of the motor vehicle corresponding to said engine before and after fuel is added to the tank;

computing values for possible fuel mixtures in the tank from these fuel quantities and known fuel mixtures available at service stations;

setting the lambda value over a pregiven number of injections alternately with adaptation values as they apply to the various possible fuel mixtures in the tank;

investigating with which value the best engine running results are obtained; and,     using the value for the best engine running obtained as the then applicable adaptation value.

17. The method of claim 16, comprising the further step of:

distributing two conceivable adaptation values amongst two cylinder groups so that cylinder assignment to an adaptation value can be varied from one cycle to the next.

18. The method of claim 16, wherein the engine running is judged with the aid of time durations during which pregiven crankshaft angles are traversed.

19. The method of claim 11, comprising the further steps of:

after starting the engine, checking if the engine is in a condition in which control is still prohibited;

if yes, then checking if the lambda probe is operationally ready;

if yes, then checking if the probe indicates a lean mixture; and,     if yes, adjusting the adaptation value in a direction for obtaining a rich mixture at a comparatively high speed for so long until the probe indicates a rich mixture or control is permitted.

20. The method of claim 16, comprising the further step of:

distributing two conceivable precontrol values amongst two cylinder groups so that cylinder assignment to a precontrol value can be varied from one cycle to the next.

* * * * *